(12) United States Patent
Liu

(10) Patent No.: US 9,765,182 B2
(45) Date of Patent: Sep. 19, 2017

(54) ELASTOMER DERIVED FROM EPOXIDIZED VEGETABLE OIL

(71) Applicant: The United States of America, as represented by the Secretary of Agriculture, Washington, DC (US)

(72) Inventor: Zengshe Liu, Morton, IL (US)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 14/478,185

(22) Filed: Sep. 5, 2014

(65) Prior Publication Data

US 2015/0087732 A1 Mar. 26, 2015

Related U.S. Application Data

(60) Provisional application No. 61/880,461, filed on Sep. 20, 2013.

(51) Int. Cl.
| | |
|---|---|
| *C08G 63/81* | (2006.01) |
| *C08G 63/42* | (2006.01) |
| *C08G 63/66* | (2006.01) |
| *C08J 9/28* | (2006.01) |

(52) U.S. Cl.
CPC ............ *C08G 63/81* (2013.01); *C08G 63/42* (2013.01); *C08J 9/286* (2013.01); *C08J 2201/0502* (2013.01); *C08J 2367/00* (2013.01)

(58) Field of Classification Search
None
See application file for complete search history.

(56) References Cited

U.S. PATENT DOCUMENTS

| | | | |
|---|---|---|---|
| 3,006,936 A | 10/1961 | Findley et al. | |
| 4,057,672 A * | 11/1977 | Creekmore | C08K 13/02 428/220 |
| 4,072,790 A * | 2/1978 | Creekmore | C08K 13/02 428/220 |
| 5,112,914 A * | 5/1992 | Mizuno | C08L 67/00 525/134 |
| 5,116,906 A * | 5/1992 | Mizuno | C08L 67/02 525/146 |
| 5,166,372 A * | 11/1992 | Crocco | C07D 301/12 549/531 |
| 5,431,930 A | 7/1995 | Patel et al. | |
| 5,766,331 A | 6/1998 | Krinski et al. | |
| 6,441,126 B1 | 8/2002 | Cook et al. | |
| 6,444,782 B1 | 9/2002 | Hamlin | |

(Continued)

*Primary Examiner* — Peter A Salamon
(74) *Attorney, Agent, or Firm* — John D. Fado; G. Byron Stover

(57) ABSTRACT

Disclosed is an elastomer synthesized by a reacting epoxidized vegetable oil with carboxylic acid to form the elastomer compound. More specifically, disclosed herein is an elastomer compound having a polyester component. The method for making the elastomer comprises mixing a polybasic acid with an alcohol solvent to form a solution, reacting said solution having carboxylic groups with epoxidized vegetable oil, and heating the solution at a range of approximately 50° C. to 80° C., wherein an amorphous polyester elastomer is formed. Also disclosed is an elastomer foam product formed by a reacting epoxidized vegetable oil with carboxylic acid.

26 Claims, 5 Drawing Sheets

(56) References Cited

U.S. PATENT DOCUMENTS

| | | | | |
|---|---|---|---|---|
| 6,528,571 | B1* | 3/2003 | Erhan | B29C 41/003 |
| | | | | 524/109 |
| 6,734,315 | B1* | 5/2004 | Nowak | C07D 301/12 |
| | | | | 549/523 |
| 6,740,763 | B1* | 5/2004 | Nowak | C07D 301/14 |
| | | | | 549/525 |
| 8,519,053 | B2* | 8/2013 | Tian | C08G 63/183 |
| | | | | 525/165 |
| 8,524,855 | B1* | 9/2013 | Tisserat | C08G 63/78 |
| | | | | 528/176 |
| 2007/0043200 | A1 | 2/2007 | Yamamoto et al. | |
| 2007/0077298 | A1* | 4/2007 | Liu | C08F 283/00 |
| | | | | 424/468 |
| 2009/0304758 | A1* | 12/2009 | Soranzo | A61K 31/385 |
| | | | | 424/402 |
| 2010/0205857 | A1* | 8/2010 | Dijk | C12P 7/06 |
| | | | | 44/452 |

* cited by examiner

ELASTOMER DERIVED FROM EPOXIDIZED VEGETABLE OIL

CROSS-REFERENCE TO RELATED APPLICATION

This present application claims priority under 35 U.S.C. §119(e) to U.S. Provisional Ser. No.: 61/880,461, which was filed on Sep. 20, 2013, and is hereby incorporated by reference.

FIELD OF INVENTION

The present invention relates generally to a reacting epoxidized vegetable oil with carboxylic acid to form an elastomer product that is devoid of petroleum products. More specifically, disclosed herein is an elastomer and a method of making the elastomer wherein the method comprises mixing a polybasic acid with an alcohol solvent to form a solution, reacting said solution having carboxylic groups with epoxidized vegetable oil, and heating the solution at a range of approximately 50° C. to 80° C., wherein an amorphous polyester is formed. Also disclosed is a elastomer foam product formed by reacting epoxidized vegetable oil with carboxylic acid.

BACKGROUND OF INVENTION

In an effort to be less reliant on petroleum products, considerable interest and research have been spent on developing a renewable elastomer product. For instance, synthetic rubbers often utilize petroleum-based polymer precursors where the monomer is a copolymerized with petroleum products such as styrene and 1,3-butadiene. As such, there is a need to develop an elastomer that are less reliant on petroleum monomers while still maintaining the advantages of physical properties of the petroleum-based elastomer.

One potential renewable resource to be used as a monomer subunit in producing an elastomer is the use of vegetable oils. Vegetable oils have received attention as a natural and renewable resource and one oil of particular interest is the use of epoxidized soybean oil. Use of epoxidized soybean oil (ESO) is well known as a plasticizer given the molecule's availability of carbon-carbon double bonds, as well as having oxirane ring moieties. Li, F., Larock, R. C., 2000, J Polym Sci B Polym Phys, 38:2721-38 discloses the preparation of polymers from soybean oil with styrene and divinylbenzene having properties ranging from elastomers to rigid plastics. Chemically modified epoxidized soybean oil, such as acrylated epoxidized soybean oil (AESO), has been widely studied by Khot S. N., et. al, J Appl Polym Sci, 2001; 82(3):703-23. Given these known properties of epoxidized vegetable oil, particularity epoxidized soybean oil, these oils are excellent candidates as a renewable resource monomer units to develop a non-petroleum based elastomer.

BRIEF SUMMARY OF THE INVENTION

Disclosed herein is a method for making an elastomer compound having a polyester component, the method comprising mixing a polybasic acid with an alcohol solvent to form a solution, reacting said solution having carboxylic groups with epoxidized vegetable oil where the epoxy group present in the epoxidized soybean oil to the carboxylic group present in the solution is at a molar ratio of approximately 1:0.8 to approximately 1:1.5; and heating the solution at a range of approximately 50° C. to 80° C., wherein a polyester elastomer is synthesized.

In one embodiment of the invention the polyester is synthesized without a catalyst. In another embodiment of the invention, the epoxidized vegetable oil is epoxidized soybean oil or epoxidized linseed oil. In yet another embodiment of the invention, the epoxidized soybean oil has 6%-7% oxiranes moieties by weight.

In another embodiment of the invention, the polybasic acid is citric acid. In a further embodiment of the invention, the citric acid is in monohydrate form. In another embodiment of the invention, the citric acid is in an anhydrous form. In yet another embodiment of the invention, the polybasic acid is selected from the group consisting of fumaric acid, adipic acid, malic acid, succinic acid, suberic acid, sebacic acid, dodecanedioic acid, glucaric acid, glutamic acid, glutaric acid, azelaic acid, and tartaric acid.

In yet another embodiment of the invention, disclosed is an elastomer produced by mixing a polybasic acid with an alcohol solvent to form a solution, reacting said solution having carboxylic groups with epoxidized vegetable oil where the epoxy group present in the epoxidized soybean oil to the carboxylic group present in the solution is at a molar ratio of approximately 1:0.8 to approximately 1:1.5; and heating the solution at a range of approximately 50° C. to 80° C., wherein a polyester is synthesized.

Disclosed herein is a method for producing a foam elastomer material having a polyester component, the method comprising mixing a dicarboxylic acid or tricarboxylic acid with an alcohol solvent to form a solution, reacting said solution having carboxylic groups with epoxidized vegetable oil wherein the epoxy group present in the epoxidized vegetable oil to the carboxylic group present in the solution is at a molar ratio of approximately 1:0.8 to approximately 1:1.5, heating the solution at a range of approximately 50° C. to 80° C., extracting the alcohol solvent; and adding salt to the solution wherein a foam elastomer material having a polyester component formed.

In one embodiment of the invention the foam elastomer material is synthesized without a catalyst. In another embodiment of the invention, the foam elastomer material is synthesized with epoxidized soybean oil or epoxidized linseed oil. In yet another embodiment of the invention, the epoxidized soybean oil has 6%-7% oxiranes moieties by weight.

In an embodiment of the invention, the foam elastomer material is synthesized with a tricarboxylic acid wherein the tricarboxylic acid is citric acid. In a further embodiment of the invention, the citric acid used to synthesize the foam elastomer material is synthesized is in monohydrate form or in an anhydrous form. In yet another embodiment of the invention, the dicarboxylic acid or tricarboxylic acid used to synthesize the foam elastomer material is selected from the group consisting of fumaric acid, adipic acid, malic acid, succinic acid, suberic acid, sebacic acid, dodecanedioic acid, glucaric acid, glutamic acid, glutaric acid, azelaic acid, and tartaric acid.

In yet another embodiment of the invention, disclosed is a foam elastomer material having a polyester component produced by mixing a dicarboxylic acid or tricarboxylic acid with an alcohol solvent to form a solution, reacting said solution having carboxylic groups with epoxidized vegetable oil wherein the epoxy group present in the epoxidized soybean oil to the carboxylic group present in the solution is at a molar ratio of approximately 1:0.8 to approximately 1:1.5, heating the solution at a range of approximately 50°

C. to 80° C., extracting the alcohol solvent; and adding salt to the solution wherein a foam elastomer material having a polyester component formed.

Figure 1:
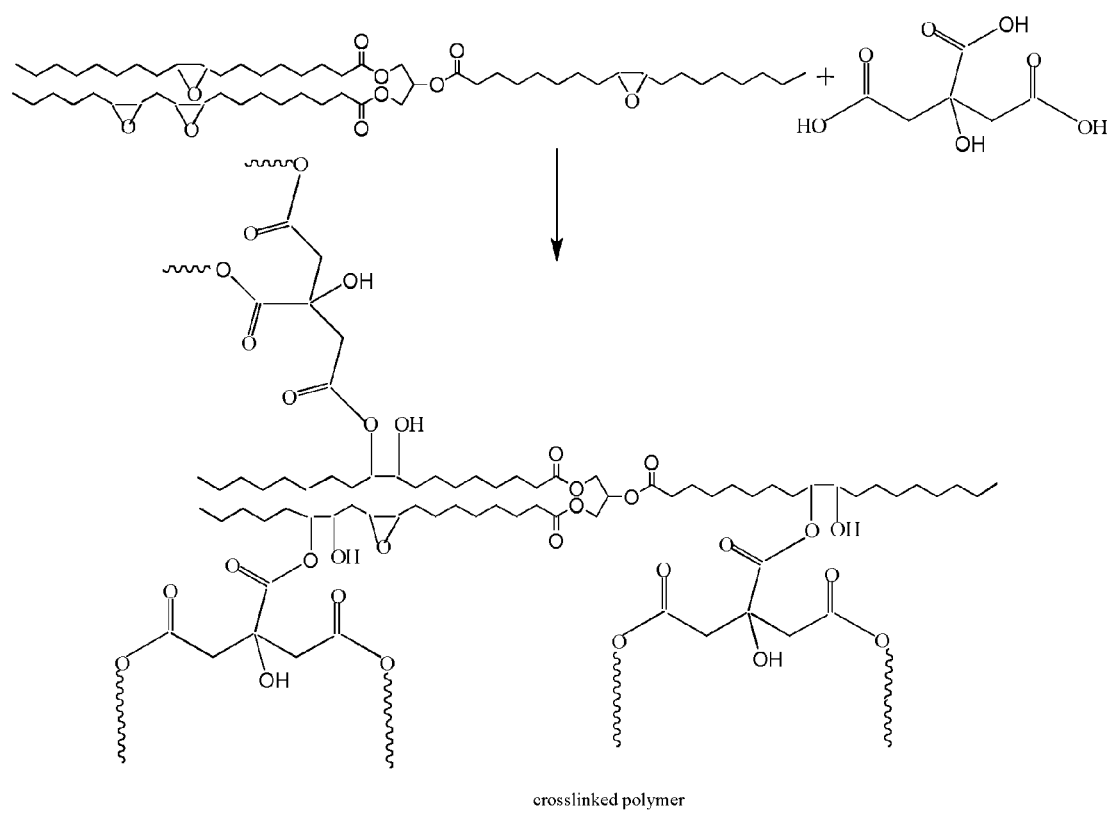
FIG. 1 depicts a polymerization reaction of epoxidized soybean oil with citric acid to synthesize a polyester.
Figure 2:
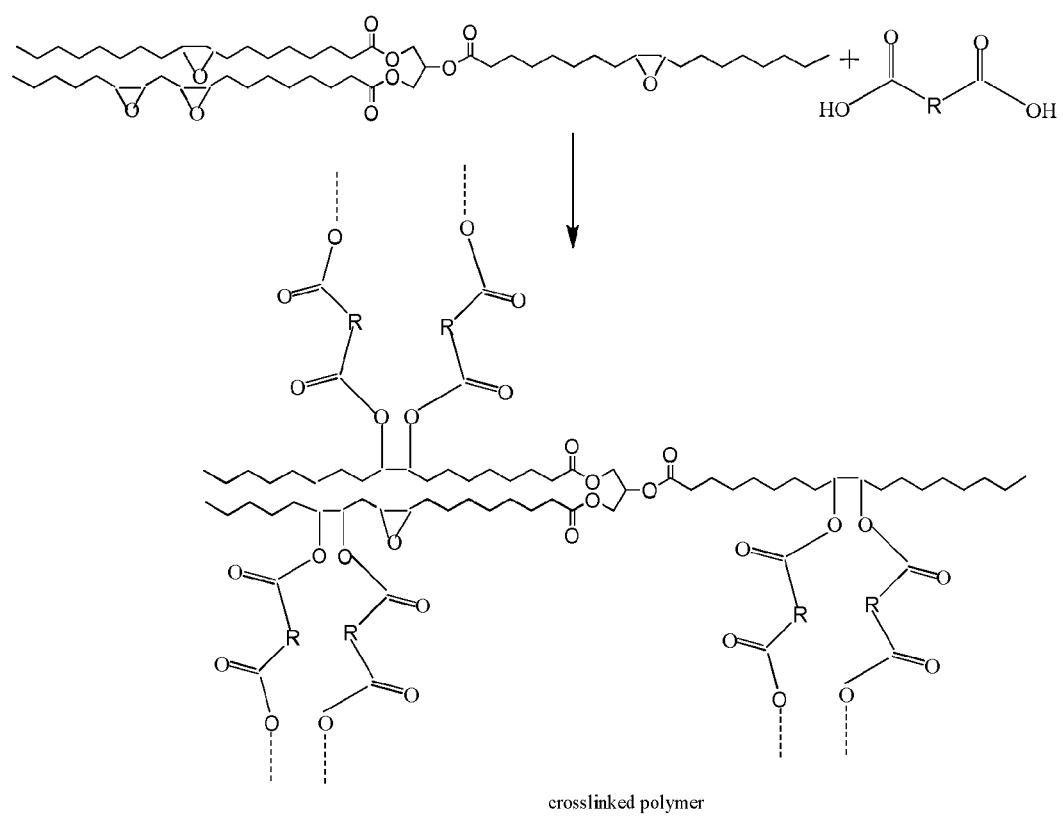
FIG. 2 depicts a polymerization reaction of epoxidized soybean oil with a dicarboxylic acid to synthesize a polyester.

The present invention together with the above and other objects and advantages may best be understood from the following detailed description of the embodiment of the invention illustrated in the drawings.

DETAILED DESCRIPTION OF THE INVENTION

Definitions

As used in the specification and claims, the singular form "a", "an" and "the" include plural references unless the context clearly dictates otherwise.

As used herein the term "elastomer" refers to material having a mechanical property that can undergo elastic deformation under stress with the material returning to its previous size without permanent deformation.

One component of the reaction mixture to synthesis either an elastomer compound or elastomer foam is the use of a vegetable oil. Examples of suitable vegetable oils include but are not limited to soybean oil, safflower oil, linseed oil, corn oil, sunflower oil, olive oil, canola oil, sesame oil, cottonseed oil, palm oil, rapeseed oil, tung oil, fish oil, peanut oil, cuphea oil, milkweed oil, salicornia oil and combinations thereof. Natural vegetable oils may be used, and also useful are partially hydrogenated vegetable oils and genetically modified vegetable oils, including high oleic safflower oil, high oleic soybean oil, high oleic peanut oil, high oleic sunflower oil, and high erucic rapeseed oil (crambe oil).

Epoxidation of vegetable oils may be carried out as described by Qureshi et al. [*Polymer Science and Technology*, Vol. 17, Plenum Press, p. 250] or by any other method as known in the art. For example, the epoxidation may be carried out by reaction of the milkweed oil with formic acid and hydrogen peroxide at an elevated temperature on the order of 75° C. The degree of epoxidation should be such that there are at least 3, and preferably at 4, or even 5, oxirane rings per triglyceride molecule wherein the epoxidized soybean oil has about 6%-7.2% oxirane moieties by weight. Typically, the epoxidation of a vegetable oil is carried to completion.

As used herein, "epoxidized vegetable oil" refers to a non-naturally occurring epoxy oil prepared by treating the vegetable oil so as to modify the chemical structure of the molecule to fully epoxidize the double bonds present in the vegetable oil.

As used herein the term "glass transition temperature" refers to the temperature at which the Gibbs free energy exceeds the activation energy for the cooperative molecular motion of the polymer. Generally speaking, the glass transition temperature is the temperature in which the polymer matrix transitions from a solid inflexible state to a soft malleable and pliable rubber state.

As used herein the term "dicarboxylic acid" or "tricarboxylic acid" refers to any and all acids that have two or three more carboxyl functional groups that can be displaced. In accordance with the disclosure invention, it is preferable that the dicarboxylic acid or tricarboxylic acid selected is "Generally Recognized as Safe" for food additives in accordance with qualified experts or recognized to be by the U.S. Food and Drug Administration. For instance, this includes, but is not limited to citric acid, fumaric acid, adipic acid, malic acid, succinic acid, glutamic acid, and tartaric acid. Furthermore, in accordance with this invention, it is recognized that the dicarboxylic acid or tricarboxylic acid can exists as either in an anhydrous or monohydrate. To the extent that various that a dicarboxylic acid or tricarboxylic acid that isn't recognized as "Generally Recognized as Safe", it is contemplated that such acids including, but not limited to suberic acid, sebacic acid, dodecanedioic acid, glucaric acid, glutaric acid, azelaic acid would be used to synthesize an elastomer or foam elastomer in accordance with the invention disclosed herein. The preferred tricarboxylic acid is citric acid inasmuch as it is environmentally friendly and is a GRAS additive.

As described herein, the preferred alcohol solvent to be used with the selected dicarboxylic acid or tricarboxylic acid is ethanol, butanol, or isopropanol. Preferably the alcohol solvent used is environmentally friendly solvent and is facile to removal from the elastomer product. Removal of the alcohol solvent can be removed via extraction techniques such as, but not limited to vacuum extraction, membrane extraction. Alternatively, separation of the elastomer product from the alcohol solvent can be accomplished via centrifugation.

As described herein, the addition of a salt to the epoxidized soybean oil, dicarboxylic acid or tricarboxylic acid, and alcohol solution yields an elastomer foam. Examples of salts used to produce the foam include, but is not limited to: sodium chloride, potassium chloride, or calcium chloride. Control of pore size in the elastomer foam can be controlled by the size of the salt particle used. Selection of the salt is dependent on the alcohol solvent used and selection of salt should have a low solubility in the alcohol solvent. In a preferred embodiment where ethanol is utilized, sodium chloride is the preferred salt to form pores in the elastomer foam.

R—C—O—C—R and OH—R—OH Reaction

Figure 3:
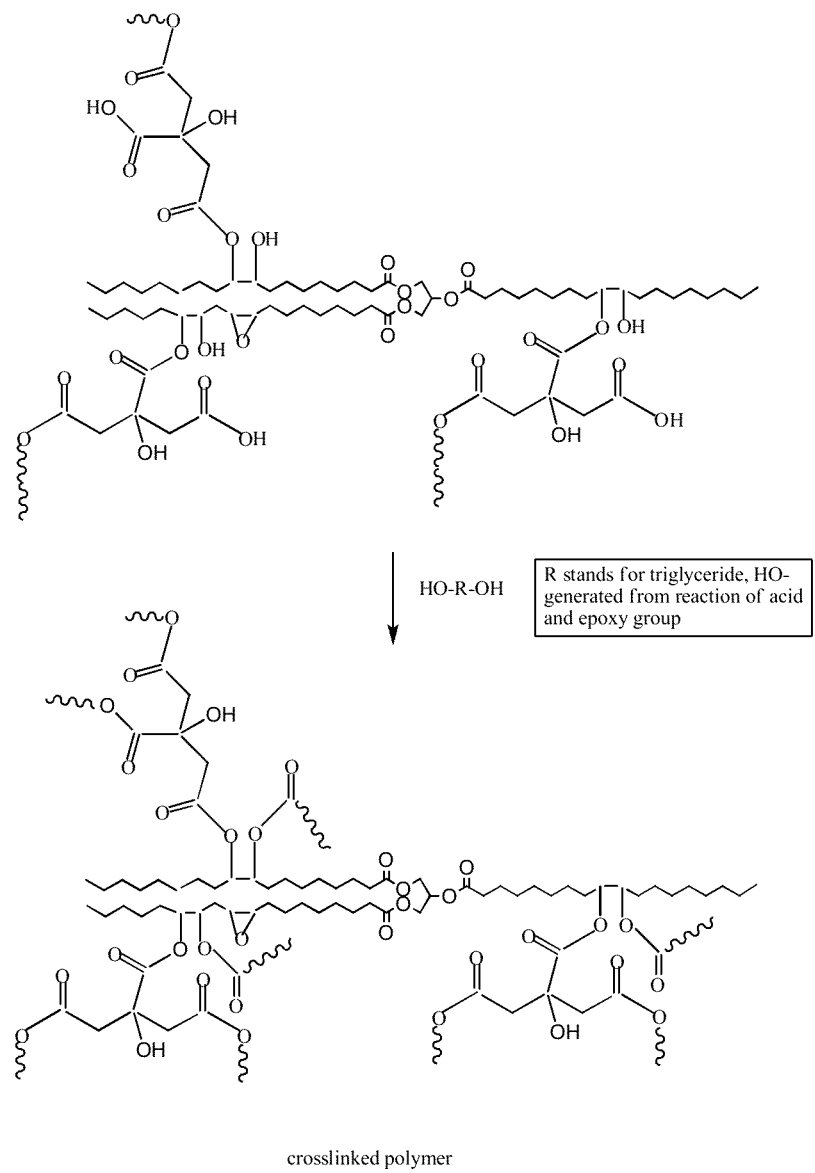
FIG. 3 depicts a reaction of hydroxyl groups generated by reaction of polybasic acid with epoxy group in the epoxidized soybean oil.
Figure 4:
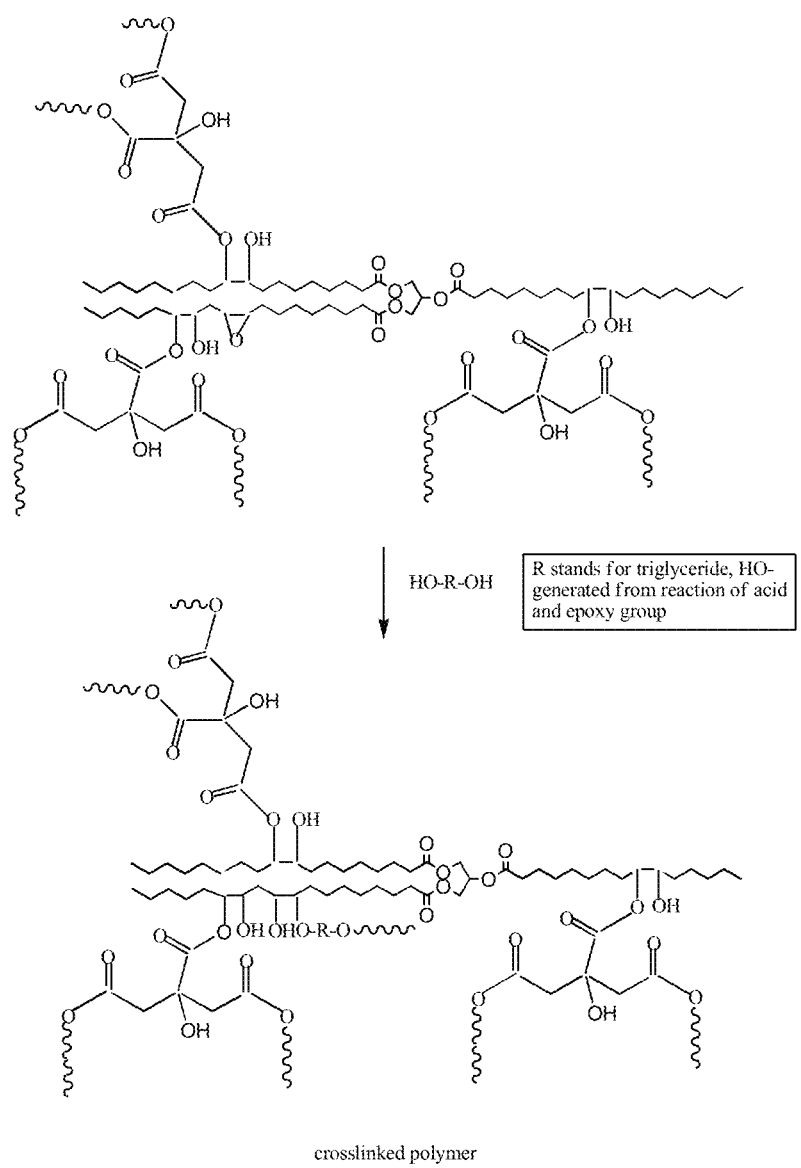
FIG. 4 depicts a reaction of the hydroxyl groups obtained in reaction of FIG. 3 with epoxy groups leading to form the crosslinked polymers with ether linkages.

The crosslinked polymers described here are prepared by reaction of a polyhydroxy triglyceride with carboxyl group from di or tri acid such as citric acid. The hydroxyl groups are generated by reaction of acid with epoxy group in the epoxidized vegetable oil. The reaction is shown in FIG. 3. An additional reaction one has to contend with is the reaction of the hydroxyl groups obtained in reaction (FIG. 1) with epoxy groups leading to form the crosslinked polymers with ether linkages (FIG. 4). The formation of ether linkages is favored in the presence of an acid.

EXAMPLE 1

Synthesis of Elastomer Product

Partially or completely epoxidized plant oils were reacted with citric acid in ethanol solvent to prepare the elastomer.

233 grams of citric acid was mixed with 240 ml ethanol to form a solution. 760 grams of epoxidized soybean oil (Vikoflex 7170 from Arkema) was then added to the solution. The solution was heated at range of approximately 50° C. to approximately 80° C. for 24 hrs and the ethanol was extracted via vacuum filtration. Optimal temperature range for polymerization occurred at 70° C. 990 grams of elastomer was obtained after remove of ethanol. The primary reaction product is a polyester containing a secondary hydroxyl group to the carboxyl carbon. The epoxidized soybean oil based polyester was synthesized in solvent using condensation polymerization without any catalysts.

EXAMPLE 2

Effect of Ratio of Epoxy/COOH

The ratio of epoxy/COOH affects the properties of elastomers, such as tackiness and glass transition temperature and degradable time. The affect of various ratio of epoxy/COOH is disclosed in Table 1. As applied to the feel of the elastomer, the carboxyl molar ratios to epoxy molar ratio in the range of 0.8:1 to 1.15:1 (—COOH:R—O—R) yielded a non-tacky elastomer base. Additionally, the carboxyl group present in a lower ratio with respect to the epoxy group (0.8:1) had a harder feel than when the carboxyl group was present in a higher ratio with respect to the epoxy (1.15:1). Similarly, carboxyl group present in a lower ratio with respect to the epoxy group (0.8:1) resulted in a higher Tg for the resulting elastomer.

TABLE 1

| Entry | Temp. (° C.) | Time (hr) | COOH (mole) | Epoxy (mole) | Elastomer | Tg (° C.) |
|---|---|---|---|---|---|---|
| 1 | 65 | 20 | 1 | 1 | ✓ | −18.1 |
| 2 | 65 | 20 | 1.15 | 1 | ✓ | −20 |
| 3 | 65 | 20 | 0.8 | 1 | ✓ | −18.6 |
| 4 | 70 | 20 | 1 | 1 | ✓ | −19.1 |
| 5 | 65 | 16 | 1 | 1 | ✓ | −18.1 |
| 6 | 65 | 7 | 1 | 1 | ✓ | −18.6 |
| 7 | 65 | 6 | 1 | 1 | ✓ | −16.4 |

EXAMPLE 3

A Foam Elastomer Material

Figure 5:
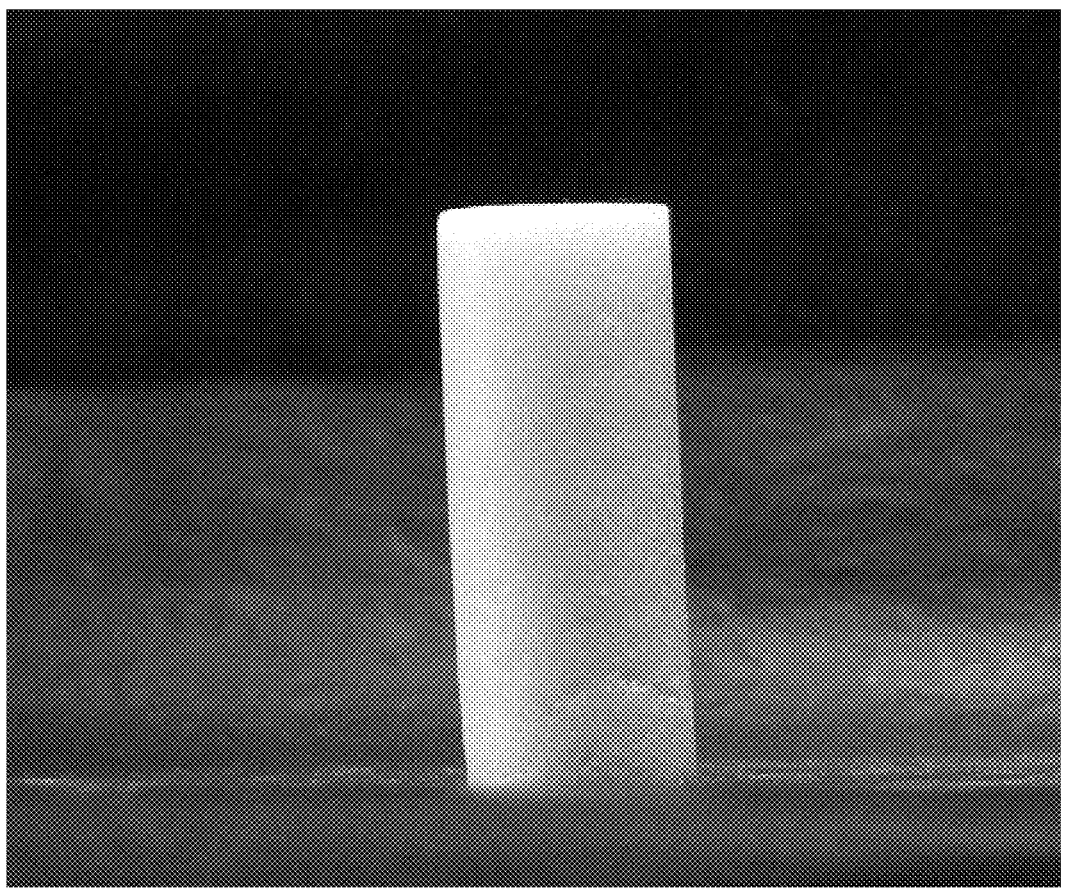
FIG. 5 depicts a foam elastomer material produce by the method disclosed herein.

To synthesize a foam elastomer material, 10 grams of epoxidized soybean oil and 2.8 grams of citric acid with 8 ml ethanol were added into a 10 ml plastic tube and placed into an oven at 65° C. for 30 minutes. Ethanol was then removed under vacuum. 12.8 g NaCl was added into the mixture and packed by centrifuge. The plastic tube, filled with the reaction material was left at 65° C. for 48 hours. After it was cooled to room temperature, the plastic tube was cut and removed. The cylinder shaped sample was soaked in DI water for a few days to remove NaCl and was freeze dried. A foam elastomer material was synthesized as depicted in FIG. 5.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the invention has been described with reference to details of the illustrated embodiment, these details are not intended to limit the scope of the invention as defined in the appended claims. All cited references and published patent applications cited in this application are incorporated herein by reference. The embodiment of the invention in which exclusive property or privilege is claimed is defined as follows:

The invention claimed is:

1. A method for making an elastomer compound having an amorphous polyester component, the method comprising:
   a) mixing a dicarboxylic acid or tricarhoxylic acid with an alcohol solvent to form a solution,
   b) reacting said solution having carboxylic groups with epoxidized vegetable oil wherein the epoxy group present in the epoxidized vegetable oil to the carboxylic group present in the solution is at a molar ratio of approximately 1:0.8 to approximately 1:1.5,
   c) heating the solution at a range of approximately 50°C to 80° C., wherein an amorphous polyester is synthesized; and
   d) extracting the alcohol solvent to leave an elastomer compound having an amorphous polyester component, wherein the elastomer compound has a glass transition temperature of between −21° C. and −13° C.; wherein said extracting is vacuum extraction, membrane extraction, or centrifugation extraction.

2. The method of claim 1 wherein the elastomer compound has an amorphous polyester component is synthesized without a catalyst.

3. The method of claim 1 wherein the epoxidized vegetable oil is epoxidized soybean oil.

4. The method of claim 3 wherein the epoxidized soybean oil has 6%-7% oxirane moieties by weight.

5. The method of claim 1 wherein the epoxidized vegetable oil is epoxidized linseed oil.

6. The method of claim 1 wherein the tricarboxylic acid is citric acid.

7. The method of claim 6 wherein the citric acid is in monohydrate form.

8. The method of claim 6 wherein the citric acid is in an anhydrous form.

9. The method of claim 1 wherein the dicarboxylic acid or tricarboxylic acid is selected from the group consisting of fumaric acid, adipic acid, malic acid, succinic acid, suberic acid, sebacic acid, dodecanedioic acid, glucaric acid, glutamic acid, glutaric acid, azelaic acid, and tartaric acid.

10. The method of claim 1 wherein the alcohol solvent is ethanol, butanol, or isopropanol.

11. An elastomer having an amorphous polyester component produced by the method described in claim 1.

12. A method for producing a foam elastomer material having a polyester component, the method comprising:
   a) mixing a dicarboxylic acid or tricarboxylic acid with an alcohol solvent to form a solution, b) reacting said solution having carboxylic groups with epoxidized vegetable oil wherein the epoxy group present in the epoxidized vegetable oil to the carboxylic group present in the solution is at a molar ratio of approximately 1:0.8 to, approximately 1:1.5, c) heating the solution at a range of approximately 50° C. to 80° C. and d) extracting the alcohol solvent and adding salt to the solution wherein a foam elastomer material having an amorphous polyester component formed; wherein said extracting is vacuum extraction, membrane extraction, or centrifugation extraction.

13. The method of claim 12 wherein the foam elastomer material having an amorphous polyester component is synthesized without a catalyst.

14. The method of claim 12 wherein the epoxidized vegetable oil is epoxidized soybean oil.

15. The method of claim 14 wherein the epoxidized soybean oil has 6%-7% oxirane moieties by weight.

16. The method of claim 12 wherein the epoxidized vegetable oil is epoxidized linseed oil.

17. The method of claim 13 wherein the tricarboxylic acid is citric acid.

18. The method of claim 17 wherein the citric acid is in monohydrate form.

19. The method of claim 17 wherein the citric acid is in an anhydrous form.

20. The method of claim 12 wherein the dicarboxylic acid or tricarboxylic acid is selected from the group consisting of fumaric acid, adipic acid, malic acid, succinic acid, suberic acid, sebacic acid, dodecanedioic acid, glucaric acid, glutamic acid, glutaric acid, azelaic acid, and tartaric acid.

21. The method of claim 12 wherein the alcohol solvent is ethanol, butanol, or isopropanol.

22. A foam elastomer having a polyester component produced by the method described in claim 12.

23. The method of claim 1 wherein the epoxidized vegetable oil is epoxidized safflower oil, epoxidized corn oil, epoxidized sunflower oil, epoxidized olive oil, epoxidized canola oil, epoxidized sesame oil, epoxidized cottonseed oil, epoxidized palm oil, epoxidized rapeseed oil, epoxidized tung oil, epoxidized peanut oil, epoxidized cuphea oil, epoxidized milkweed oil, or epoxidized salicornia oil.

24. The method of claim 23 wherein the epoxidized vegetable oil is epoxidized corn oil.

25. A method for making an elastomer compound having an amorphous polyester component, the method consisting of:

a) mixing a dicarboxylic acid or tricarboxylic acid with an alcohol solvent to form a solution, b) reacting said solution having carboxylic groups with epoxidized vegetable oil wherein the epoxy group present in the epoxidized vegetable oil to the carboxylic group present in the solution is at a molar ratio of approximately 1:0.8 to approximately 1:1.5, c) heating the solution at a range of approximately 50° C. to 80° C., wherein an amorphous polyester is synthesized; and d) extracting the alcohol solvent to leave an elastomer compound having an amorphous polyester component, wherein the elastomer compound has a glass transition temperature of between $-2120$ C. and $-13°$ C.; wherein said extracting is vacuum extraction, membrane extraction, or centrifugation extraction.

26. A method for producing a foam elastomer material having a polyester component, the method consisting of:

a) mixing a dicarboxylic acid or tricarboxylic acid with an alcohol solvent to form a solution, b) reacting said solution having carboxylic groups with epoxidized vegetable oil wherein the epoxy group present in the epoxidized vegetable oil to the carboxylic group present in the solution is at a molar ratio of approximately 1:0.8 to approximately 1:1.5, c) heating the solution at a range of approximately 50° C. to 80° C.; and d) extracting the alcohol solvent and adding salt to the solution wherein a foam elastomer material having an amorphous polyester component formed; wherein said extracting is vacuum extraction, membrane extraction, or centrifugation extraction.

\* \* \* \* \*